Jan. 13, 1948.  P. N. CURRY  2,434,458
SEALING DEVICE FOR SHAFTS
Filed May 20, 1944
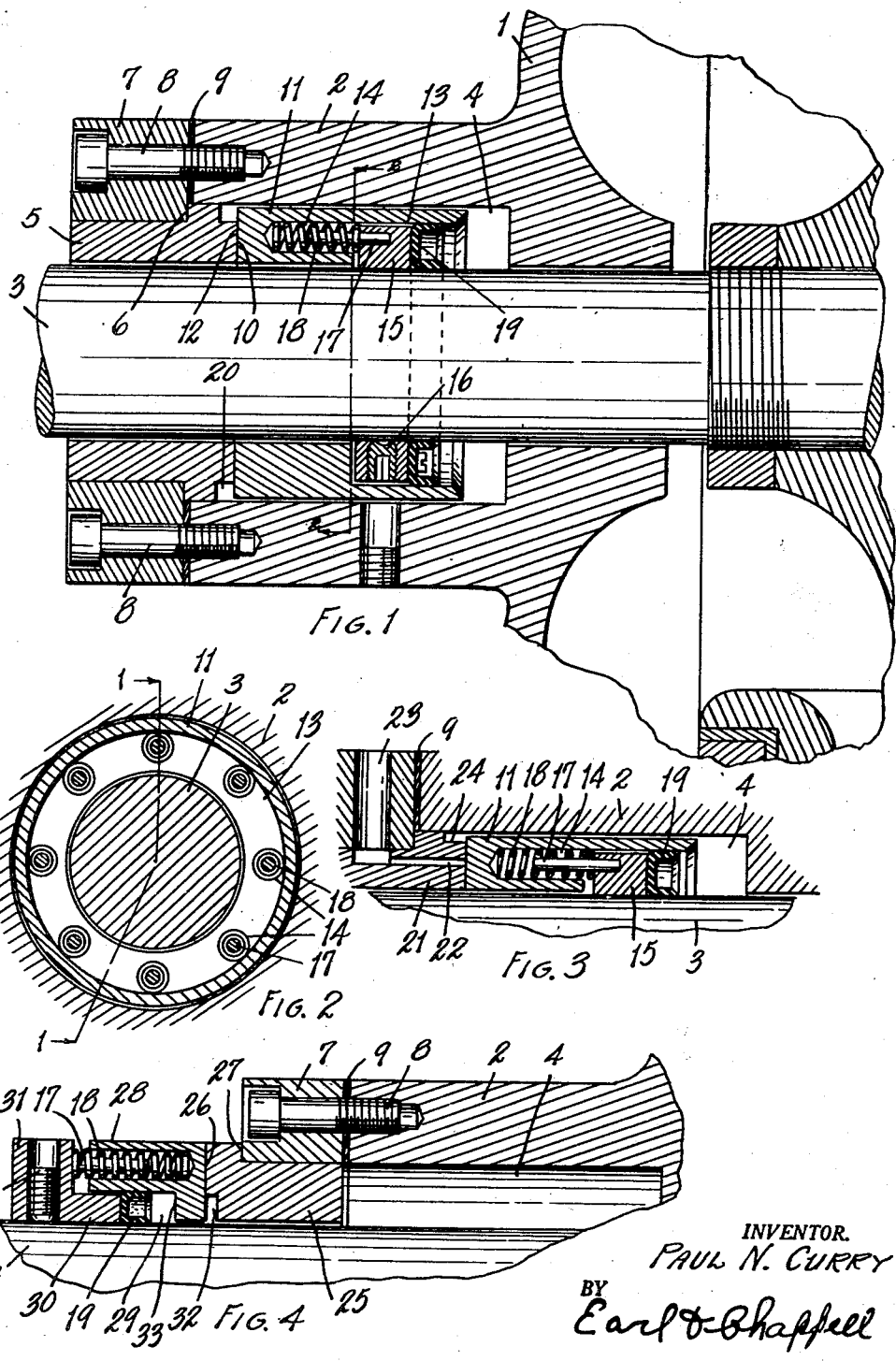
INVENTOR.
PAUL N. CURRY
BY
Earl D. Chappell
ATTORNEYS.

Patented Jan. 13, 1948

2,434,458

UNITED STATES PATENT OFFICE 2,434,458

SEALING DEVICE FOR SHAFTS

Paul N. Curry, Kalamazoo, Mich., assignor to Durametallic Corporation, Kalamazoo, Mich., a corporation of Michigan Application May 20, 1944, Serial No. 536,559

3 Claims. (Cl. 286—7)

This invention relates to improvements in sealing devices for shafts.

The main objects of this invention are:

First, to provide a sealing device for shafts for pumps and other apparatus operating under high pressure which is efficient and at the same time durable.

Second, to provide a sealing device of the type indicated in which the pressure on the sealing elements remains substantially constant throughout a wide variation or range in pressures to which the sealed joint may be subjected.

Third, to provide a structure having these advantages which is comparatively simple in its parts and easily assembled and installed.

Objects relating to details and economies of the invention will appear from the description to follow. The invention is defined and pointed out in the claims.

Preferred embodiments of the invention are illustrated in the accompanying drawing, in which:

Fig. 1 is a fragmentary view with parts in longitudinal section of a centrifugal pump structure embodying my invention, the parts being sectioned on a line corresponding to line 1—1 of Fig. 2.

Fig. 2 is a fragmentary transverse section on line 2—2 of Fig. 1.

Fig. 3 is a fragmentary longitudinal section of a modified form or embodiment of my invention.

Fig. 4 is a fragmentary view partially in longitudinal section of a further modification or embodiment of my invention.

In the embodiment of my invention illustrated in Figs. 1 and 2, I represents the casing or housing of a centrifugal pump having an extension 2 surrounding the shaft 3. The details of the pump are not illustrated. The portion 2 of the housing is provided with an internal chamber 4.

I provide an annular seal bearing member 5 externally shouldered at 6 and fitting within and centered by the housing. The retaining ring 7 embraces and further centers and supports the seal bearing element, the ring being secured to the end of the housing by means of screws 8, a gasket 9 being arranged between the end of the housing and the ring to provide a sealed joint. The seal bearing element has a bearing face 10.

The sealing element 11 is arranged within the housing, in the embodiment shown in Figs. 1 and 2, and has a face 12 in bearing sealing engagement with a bearing face of the seal bearing element. The sealing element 11 has an internal chamber 13 open at its inner end and has longitudinal bores 14 extending from this chamber.

The thrust or abutment collar 15 is secured to the shaft by means of the set screw 16 and is positioned in the chamber of the bearing element in substantially spaced relation from its inner end. This thrust collar or abutment is provided with a plurality of pins 17 which extend into the bores 14 and support the springs 18 arranged within the bores, the springs being seated against the thrust collar and also against the inner ends of the bores to yieldingly urge the sealing element against the seal bearing element. The sealing element is, through this arrangement of pins and springs and the thrust collar, connected to the shaft to rotate therewith.

In this embodiment illustrated, the annular flexible packing 19 is of the cup-type or of channel cross section providing inner and outer flexible walls and is arranged within the sealing element to coact therewith and with the shaft, being in abutting supporting relation to the thrust collar. The packing including the inner and outer annular walls thereof are subject to pressure within the housing to force said walls radially into coacting sealing relation with the shaft and circular wall of the chamber 13 of the sealing element.

It will be noted that the seal bearing element 5 is partially cut away at 20 to expose a portion of the bearing face of the sealing element to the fluid pressure within the housing. This exposed portion is preferably substantially the same in area as the portion of the inner end of the bearing element exposed to the fluid pressure so that the fluid pressure on the opposite ends of the sealing element is substantially counter-balanced and the sealing element is urged against the seal bearing element with a substantially predetermined pressure at all times notwithstanding variations in the fluid pressure in the housing.

In the embodiment of my invention shown in Fig. 3, the seal bearing element 21 is provided with lubricant passages 22 opening to its bearing for lubricating the seal. These passages 22 are connected to a source of lubricant supply 23. In this embodiment, the seal bearing element is partially cut away at 24 to expose a portion of the sealing element to the fluid pressure, this exposed area however being somewhat less than the area of the sealing element subject to the liquid pressure acting to urge the sealing element against the seal bearing element so that there is some fluid pressure cooperating with the springs.

In the embodiment of my invention shown in Fig. 4, the seal bearing element 25 is arranged within the supporting ring 7 to be centered thereby but the member 25 is arranged with its bearing face 26 outwardly and is shouldered at 27 to engage the outer end of the retaining ring. The annular sealing element 28 of this embodiment has a chamber 29 therein into which the flange 30 of the thrust collar or abutment member 31 secured to the shaft projects. The pins 17 and springs 18 are arranged substantially as in the embodiments described. The packing 19 here illustrated is also of the cup-type or channel type and is arranged facing inwardly to be subject to the pressure of the fluid within the housing 2. In this embodiment, the bearing face of the seal bearing element is cut away at 32 to expose an area of the sealing element substantially equal to the surface 33 thereof exposed to the fluid pressure within the housing so that in this construction the fluid pressure substantially balances and the sealing element is urged against the seal bearing member at substantially predetermined pressure by means of the springs. This embodiment shown in Fig. 4 is especially desirable where my improved seal is applied to an erected structure—that is, one in which it might not be convenient to arrange the sealing parts within the housing as illustrated in Figs. 1, 2 and 3.

I have not attempted to illustrate or describe other embodiments of my invention as it is believed that this disclosure will enable those skilled in the art to embody or adapt my improvements as may be desired.

Having thus described my invention, what I claim as new and desire to secure by Letters Patent is:

1. The combination with a rotatable shaft and a housing associated therewith, of an annular seal bearing element for surrounding the shaft and adapted to project into the housing, said bearing element having an outwardly facing external shoulder, a retaining ring detachably connected to said housing and surrounding said seal bearing element and engaging the shoulder thereof, an annular sealing element for coaction with said seal bearing element and having an internal annular chamber completely encircling said shaft and extending longitudinally thereof, said chamber being open at one end, said sealing element having a plurality of longitudinal bores opening to its said chamber and having end walls at their opposite ends, a thrust collar secured to said shaft and disposed within said chamber of said sealing element, pins disposed in said annular chamber and extending longitudinally thereof and carried by said thrust collar and projecting into said bores, springs disposed around said pins within said bores and disposed in end abutting relation to said thrust collar and with the end walls of said bores for urging said sealing element against said seal bearing element, said retaining ring engaging said shoulder to oppose the thrust of the sealing element against the seal bearing element, and an annular inwardly facing flexible packing of channel section arranged within said chamber of said sealing element at the inner side of and in supported relation to said thrust collar and in coacting relation to the shaft and the sealing element, said pins and springs being disposed axially on the opposite side of the thrust collar from said packing.

2. The combination with a rotatable shaft and a housing associated therewith, of an annular seal bearing element for surrounding the shaft and adapted to project into the housing, said bearing element having an outwardly facing external shoulder, a retaining ring detachably connected to said housing and surrounding said seal bearing element and engaging the shoulder thereof, an annular sealing element for coaction with said seal bearing element and having an internal annular chamber completely encircling said shaft and extending longitudinally thereof, said chamber being open at one end, said sealing element having a plurality of longitudinal bores opening to its said chamber and having end walls at their opposite ends, a thrust collar secured to said shaft and disposed within said chamber of said sealing element, pins disposed in said annular chamber and extending longitudinally thereof and carried by said thrust collar and projecting into said bores, springs disposed around said pins within said bores and disposed in end abutting relation to said thrust collar and with the end walls of said bores for urging said sealing element against said seal bearing element, said retaining ring engaging said shoulder to oppose the thrust of the sealing elements against the seal bearing element, and a packing arranged within said chamber of said sealing element at the inner side of and in supported relation to said thrust collar and in coacting relation to the shaft and the sealing element, said pins and springs being disposed axially on the opposite side of the thrust collar from said packing.

3. The combination with a shaft and housing associated therewith, of an annular seal bearing element, a coacting annular sealing element having an internal annular chamber completely encircling said shaft and extending longitudinally thereof, said chamber being open at one end, said sealing element having a plurality of longitudinal bores opening to said chamber and having end walls at their opposite ends, a thrust collar secured to said shaft and disposed within said chamber of said sealing element, pins disposed in said annular chamber and extending longitudinally thereof and carried by said thrust collar and projecting into said bores, springs disposed around said pins within said bores in supported engagement with said thrust collar for urging said sealing element against said seal bearing element, and an annular inwardly facing flexible packing of channel section arranged within said chamber of said sealing element at the inner side of and in supported relation to said thrust collar and in coacting relation to the shaft and the sealing element, said pins and springs being disposed axially on the opposite side of the thrust collar from said packing.

PAUL N. CURRY.

REFERENCES CITED

The following references are of record in the file of this patent:

UNITED STATES PATENTS

| Number | Name | Date |
| --- | --- | --- |
| 2,075,769 | McCormack | Mar. 30, 1937 |
| 846,237 | Nolan | Mar. 5, 1907 |
| 2,220,771 | McHugh | Nov. 5, 1940 |
| 2,249,188 | Stevenson | July 15, 1941 |
| 1,877,688 | Petersen | Sept. 13, 1932 |
| 1,931,724 | Fageal et al. | Oct. 24, 1933 |
| 2,010,930 | Rowe | Aug. 13, 1935 |
| 2,383,862 | Hornschuch | Aug. 28, 1945 |

FOREIGN PATENTS

| Number | Country | Date |
| --- | --- | --- |
| 159,255 | Great Britain | 1921 |